(12) United States Patent
Hoch

(10) Patent No.: US 11,756,271 B2
(45) Date of Patent: Sep. 12, 2023

(54) VISUALISATION ASSEMBLY

(71) Applicant: Alexander Hoch, Tiefenbronn (DE)

(72) Inventor: Alexander Hoch, Tiefenbronn (DE)

( * ) Notice: Subject to any disclaimer, the term of this patent is extended or adjusted under 35 U.S.C. 154(b) by 49 days.

(21) Appl. No.: 17/614,136

(22) PCT Filed: May 15, 2020

(86) PCT No.: PCT/EP2020/063712
§ 371 (c)(1),
(2) Date: Nov. 24, 2021

(87) PCT Pub. No.: WO2020/239482
PCT Pub. Date: Dec. 3, 2020

(65) Prior Publication Data
US 2022/0270329 A1    Aug. 25, 2022

(30) Foreign Application Priority Data
May 29, 2019 (DE) ..................... 10 2019 114 495.7

(51) Int. Cl.
*G06T 19/00* (2011.01)
*G06T 15/10* (2011.01)
*G06T 17/00* (2006.01)

(52) U.S. Cl.
CPC ............ *G06T 19/006* (2013.01); *G06T 15/10* (2013.01); *G06T 17/00* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 5,687,305 A | * | 11/1997 | Graham .................. G06T 3/005 345/662 |
| 9,761,045 B1 | | 9/2017 | Côté et al. |
| 2012/0194859 A1 | | 8/2012 | Oda |
| 2019/0122435 A1 | | 4/2019 | Prideaux-Ghee et al. |

FOREIGN PATENT DOCUMENTS

| AU | 2014275191 B2 | 8/2017 |
|---|---|---|
| DE | 202 03 367 U1 | 5/2003 |

OTHER PUBLICATIONS

International Search Report, issued in PCT/EP2020/063712, dated Aug. 20, 2020.

* cited by examiner

*Primary Examiner* — Robert J Craddock
(74) *Attorney, Agent, or Firm* — Birch, Stewart, Kolasch & Birch, LLP

(57) ABSTRACT

A visualisation assembly including a three-dimensional physical projection object and an electronic visualisation device has: a camera for optically capturing the physical projection object; electronics having data-processing software by means of which image data can be generated from the optical capturing of the physical projection object and a rendered VR model can be generated on the basis of the image data created and the stored model data; and a display apparatus, on which the physical projection object superimposed with the rendered VR model can be displayed. The physical projection object forms a relief.

20 Claims, 4 Drawing Sheets

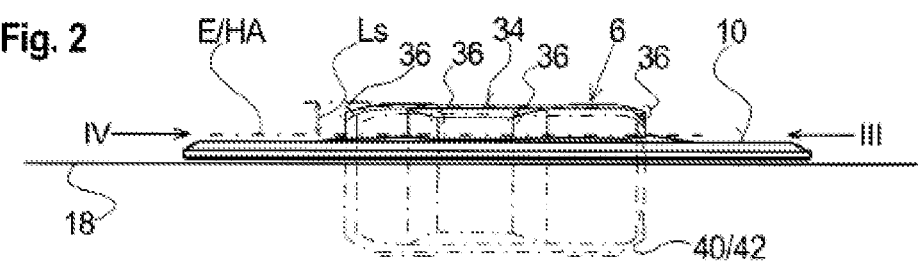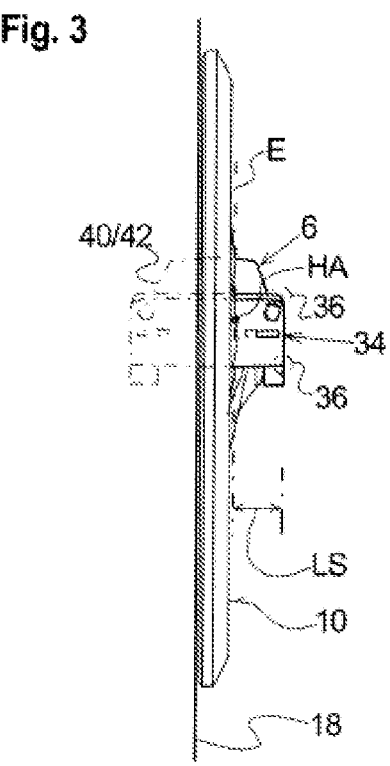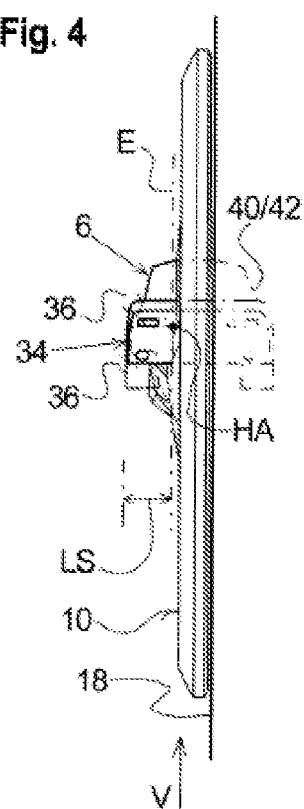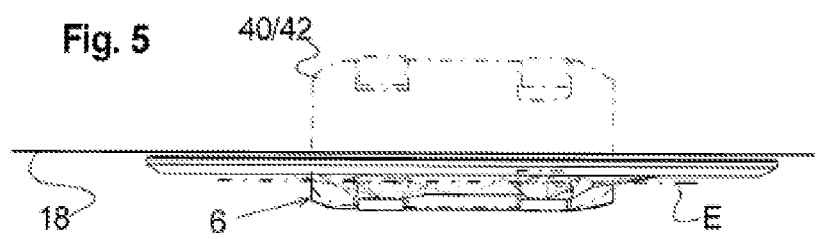

VISUALISATION ASSEMBLY

Figure 1:
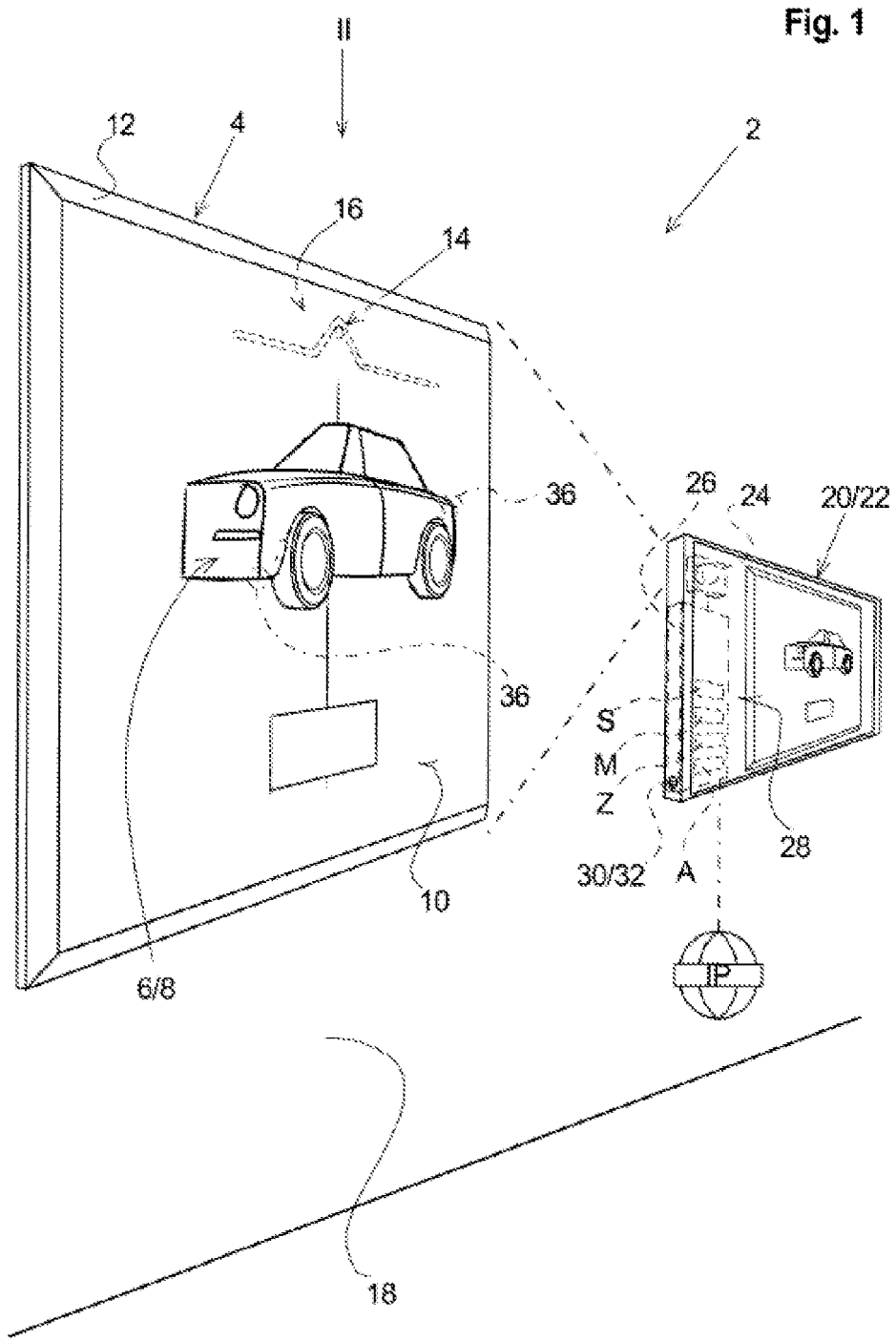

The invention relates to a visualisation assembly, such as in particular for reproducing a model of a means of transport, such as in particular an automobile, according to the generic term of claim 1, and to a method for operating such a visualisation assembly. The visualisation assembly has a physical projection object comprising a 3-dimensional, substantially convex projection surface. Furthermore, an electronic visualisation device is provided, wherein the visualisation device comprises a camera for optical capturing of the physical projection object. Furthermore, the visualisation assembly comprises electronics with data-processing software by means of which image data can be generated from the optical capturing of the physical projection object. Furthermore, the data-processing software enables the creation of a rendered VR model on the basis of the generated image data and previously stored model data. Furthermore, the visualisation assembly comprises a display apparatus on which the physical projection object superimposed with the rendered VR model can be displayed.

From DE20203367U1 a device for the visualisation of a motor vehicle design model is known, by which the design phase based on a clay model is to be improved or shortened. For this purpose, a clay model is constructed which serves as a projection object within whose outer boundary possible design variants can be represented as augmentation objects. The real clay model or a relevant part of this clay model is superimposed or augmented with at least one virtual design study such as, for example, a wheel/tyre, a headlamp, lights, a radiator grille, joint contours or various front/rear views. The virtual design studies serve in particular for the representation of variants which can be used, for example, for the pre-selection of a limited number of embodiments on the basis of which elaborate design prototypes are then created.

Such design visualisations thus serve to superimpose a 3-dimensional object to be provided with a design with a correspondingly extending virtual 3-dimensional design model in order to make it possible to experience different design variants of the object as realistically as possible. Against this background, the known visualisation devices have the highest possible correspondence between the physical projection object and the models to be augmented.

Especially in the marketing of means of transport and in articles for enthusiasts of means of transport, there is also a need for models that convey a high degree of realism and/or produce special technical effects.

The visualisation devices described above are so far neither known nor suitable for these use purposes, since they are neither suitably dimensioned nor economically producible, in particular due to the shaping and material composition necessary for the design studies.

The task of the invention is to avoid the mentioned disadvantages in a visualisation assembly and to enable a comfortable and appealing use for marketing purposes or as an enthusiast's article of means of transport.

This task is solved by a visualisation assembly having the features of claim 1. In this case, the physical projection object forms a relief, such as in particular a high relief, which extends only over a part of the rendered VR model. Further parts of the VR model extending beyond the relief, which are required, for example, for a realistic reproduction of a front or rear side, are, on the other hand, only generated virtually by the VR model. This results in an easy-to-handle physical projection object on which a partial model is formed and which can be superimposed with a virtually completed VR model. The projection object can be used as a reference object to create a completed VR model in the same perspective depending on the viewing angle of the camera on the projection object and to augment the projection object in this way, in particular in real time. This allows the projection object to be used, for example, as a special accessory or design object for marketing or as an article for enthusiasts of the means of transport depicted, such as high-quality vehicles in particular. Due to its relatively flat and compact form, it can be positioned in the manner of a picture or painting, in particular on a wall, and augmented as required by means of the visualisation device.

It is advantageous when the projection object has a base surface from which the relief extends, wherein the base surface is formed by a base plate or a mirror, for example. This allows the projection object to be used and handled in the manner of an image, in which the VR model generated on the display apparatus can extend into the base surface of the projection object.

In a particularly preferred embodiment, the relief of the projection object forms a partial model of a means of transport, such as a car, a watercraft or an aircraft. In these cases, the partial models refer to objects that are usually at least substantially axisymmetrical and are thus particularly suitable for being completed in the course of a virtual reality representation.

Advantageously, the VR model can be generated as a full model that is partially rendered in the region of the partial model and extends in the direction of the base surface of the projection object. By superimposing the relief with the virtual full model in this way, the latter extends in its virtual representation into the projection object or through its base surface. This creates a special optical effect on the augmented projection object when the VR model is generated on the display apparatus.

In addition, it is advantageous when the partial model of the projection object extends with respect to the VR model at least from a mirror plane extending through a main longitudinal axis of the full model to an outer side. In this way, the projection object extends over at least one symmetry half of the VR model to be created, whereby the projection object can be rendered particularly precisely with the half of the VR model and thus a particularly realistic-looking augmentation is possible. Alternatively, it is possible for the partial model to extend perpendicular to the base surface from the outer side over less than half of the VR model to be created, such as in models with a relatively large extension perpendicular to the base surface. In these cases, the relatively small physical partial model of the projection object is superimposed with a relatively large VR model that virtually extends through the base surface relatively far into the wall. In this way, a relatively flat and compact shape of the projection object can be maintained despite the relatively large extension perpendicular to the base surface.

Advantageously, the partial model of the projection object has a smaller scale perpendicular to a base surface than in the direction parallel to the base surface. The resulting compression of the model perpendicular to the base surface of the projection object allows it to be made available in a particularly flat and compact form. This allows the projection object to be attached to a wall, for example, as a design object in the manner of a picture. The smaller scale perpendicular to the base surface is chosen in such a way that the compression compared to the extension resulting from the actual scale is at most 80%, preferably up to 40%. Alternatively, the partial model can have the same scale in all directions, especially in the case of models that have a relatively small extension perpendicular to the base surface or the wall.

In addition, it is advantageous when several markers are provided on the projection object which can be recognised and assigned by the visualisation device and which have a three-dimensional distribution. The markers are used to create the VR model in a perspective adapted to a respective viewing angle of the camera in real time. Due to the 3-dimensional distribution of the markers, the rendering can be depicted particularly accurately on the partial model of the relief regardless of the viewing angle, whereby the VR model reproduced on the display apparatus is depicted particularly realistically on the projection object.

It is advantageous when the markers are at least partially formed by contours of the relief. In this way, a very precise and realistic superimposition of the relief reproduced on the display apparatus with the virtual VR model can be achieved through characteristic regions of the relief itself and thereby a very realistic augmentation of the projection object as a whole.

In a particularly advantageous embodiment, the projection object extends away from wall mounting means, such as, for example, a flat back or a frame to which, in particular, hook-, eye- and/or cord-shaped mounting aids can be attached or are attached. Alternatively, the base plate itself, which forms the base surface, can be provided with mounting means on the rear side, by means of which the projection object can be fastened to a wall. This allows the projection object to be hung on a wall in the manner of a picture, in particular in a position that can be easily captured by the camera. In this way, the projection object can in itself function as a decorative object or marketing object.

It is convenient when the wall mounting means have a picture frame. In this way, further regions can be optically assigned to the projection object in addition to the relief, in which further optical contents and effects are virtually generated during reproduction on the display apparatus and displayed via the display apparatus.

Advantageously, a physical projection surface, in particular a flat one, is stretched within the base surface between the relief and an edge of the base surface or a frame part of the picture frame, on which information or representations going beyond the mere reproduction of the VR model can be reproduced during reproduction on the display apparatus.

In this case, it is convenient when, in addition to the model data, additional information data is stored on the electronics, by means of which additional information or additional virtual graphics can be generated on the projection surface. During display on the display apparatus, additional information such as vehicle data, detailed views, construction views, exploded views or background images or films can be displayed in the region of the base surface of the projection object.

Furthermore, it is convenient when, in addition to the model data, audio files are stored on the electronics, by means of which an acoustic output in the form of speech, noises, such as in particular driving or engine noises, or music, can be generated, for example via acoustic means in the form of loudspeakers which are connected to the electronics via a cable or wirelessly.

Preferably, the model data, the additional information data and/or the audio files can thereby be downloaded to the electronics, such as from the internet. In this way, the user can individually compile the desired functions or expand them as needed.

In addition, it is convenient when at least the camera and the display apparatus or the visualisation device as a whole is formed by a commercially available portable computer device, such as a mobile phone, a tablet computer or VR glasses, whereby the hardware required for the visualisation assembly can be provided relatively inexpensively.

In a preferred embodiment, the projection object is at least partially produced from a concrete or asphalt material. This allows in particular the relief to be produced with a sufficiently high level of detail. In addition, in the case of vehicle models, there is in this way a thematic connection between the material used for the relief, which at least with regard to the components used has a high degree of correspondence with usual road construction material. Due to this thematic connection, a special effect can be created for the viewer by the augmented projection object.

Furthermore, the above-mentioned task is solved by a method for operating a visualisation assembly in one of the embodiments mentioned above, in which, in a first step, the camera is directed onto the physical projection object for optical capturing, in a second step, image data of the physical projection object are created on the basis of the optical capturing by means of the data-processing software, in a third step, the created image data is superimposed with the stored model data to create the rendered VR model, and in a fourth step, the physical projection object with the superimposed rendered VR model is displayed on the display apparatus. In this process, the projection object is attached to a wall before the first step, in the manner of a picture. In the fourth step, the VR model rendered on the relief is then displayed. Here, the partial model formed by the relief is extended or completed by the VR model in the direction of the wall, so that the augmented model of the means of transport can be viewed by the user from as many perspectives as possible and as completely as possible. In this way, on the one hand, a 3-dimensional physical partial model is available that can be attached to a wall and presented in the manner of a picture. Via optical capturing by means of the camera and processing by means of the electronics, the partial model can be completed on the display apparatus and provided with various details and equipment features, such as paint, rims, tyres and door handles. Furthermore, additional information or animations can be displayed on the projection object at the display apparatus in addition to the actual VR model. In any case, the projection object, which itself serves as a 3-dimensional decoration or presentation object, can be expanded and supplemented with content on the display apparatus almost at will. The viewer is thus provided with a completely new form of augmented decoration or presentation object in which a virtual model is firmly embedded in a physically perceptible image-like decoration or presentation object.

In this context, it is convenient when the additional information data stored on the electronics are used to generate the additional information and display it on the display apparatus next to the VR model, whereby, for example, certain information on the displayed model, such as vehicle data, detailed drawings or exploded views of certain construction parts, can be displayed in a particularly appealing manner. Furthermore, at least parts of the VR model can be animated by the additional information data or background films can be faded in.

Advantageously, in the fourth step, additional audio files can be selected and their content output via the acoustic means. In this way, additional information can also be output acoustically. Furthermore, sounds such as typical engine or driving noises can be output or certain animations can also be set to music.

In addition, it is convenient when the model data, the additional information data and/or the audio files are displayed in a selection menu before they are output, whereby they can be selected and activated by the user individually or as required.

Advantageously, the model data, the additional information data and/or the audio files can be selected via an internet platform and downloaded to the electronics of the visualisation device. In this way, the contents that can be displayed via the visualisation assembly can be selected as required and subsequently changed or expanded.

It should be noted that all of the above-described features of the object according to the invention can be interchanged or combined with one another, provided that an interchange or combination thereof is not precluded for technical reasons.

The figures show an exemplary embodiment of the invention. They show:

FIG. 1 a perspective view of a visualisation assembly

FIG. 2 a top view on the roof side of a projection object of the visualisation assembly in direction II from FIG. 1, FIG. 3 a front view of the projection object in direction III from FIG. 2

FIG. 4 a rear view of the projection object in direction IV from FIG. 2

FIG. 5 a ground view of the projection object in direction V from FIG. 4

Figure 6:
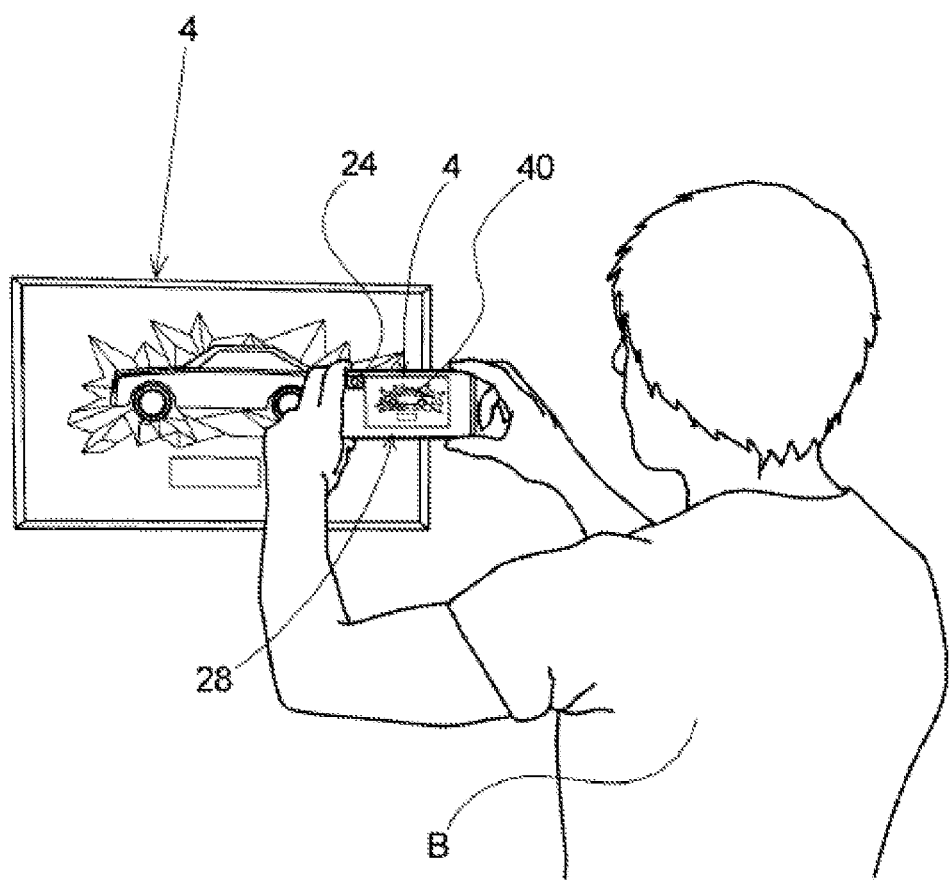

FIG. 6 a view of the visualisation assembly during use by a user and

Figure 7:
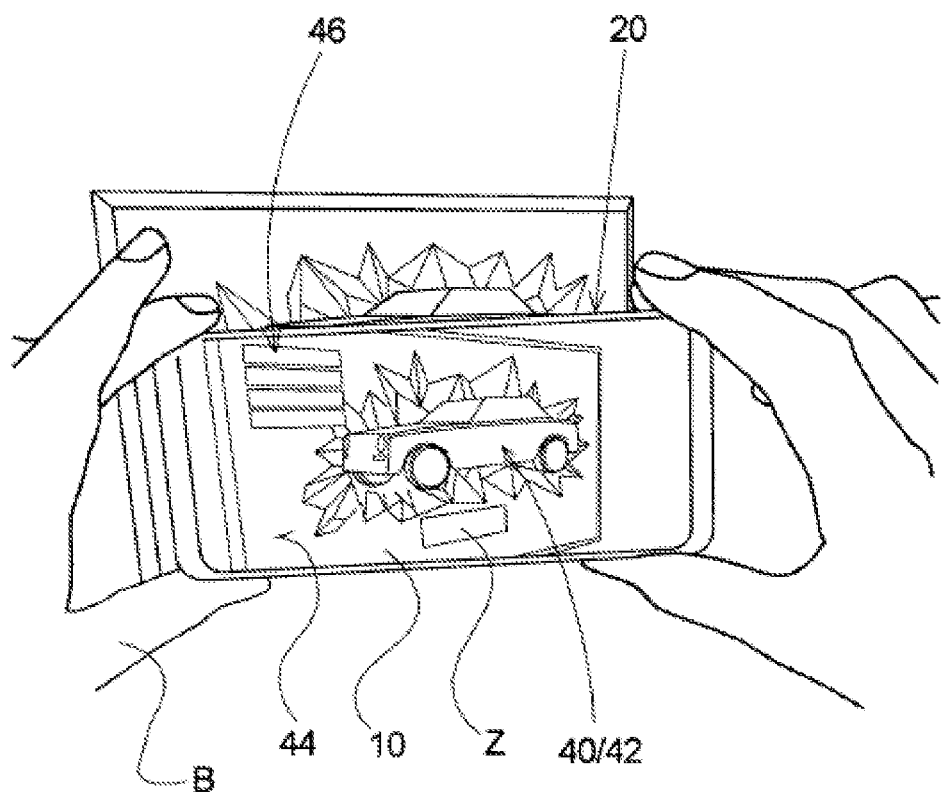

FIG. 7 an enlarged view of the visualisation assembly of FIG. 6 during a perspective display of the front side of an augmented model.

FIG. 1 shows a visualisation assembly 2 for displaying a model of a means of transport in the exemplary form of an automobile. The visualisation assembly 2 has a physical projection object 4 on which a 3-dimensional partial model 6 of the means of transport is formed. The partial model 6 is formed by a relief 8 or a high relief which extends away from a base surface 10 of the projection object 4, which is formed, for example, by a base plate or a mirror extending laterally beyond the relief 8. The base surface 10 is thereby delimited by a frame 12 and has wall mounting means 16 on a rear side 14 which are, for example, hook-, eye- and/or cord-shaped and by means of which the projection object 4 can be mounted on a wall 18 in the manner of a picture.

In addition, the visualisation assembly 2 comprises a visualisation device 20 for optical capturing and reproduction of the projection object 4. For this purpose, the visualisation device 20 is exemplarily formed by a portable computer device 22 comprising a camera 24 for capturing of the projection object 4, an electronics 26 for processing the acquired image data by means of stored data-processing software S, and a display apparatus 28 in the form of a display or monitor for reproducing generated image contents. In addition, model data M, additional information data Z and audio files A are stored in the electronics 26 of the visualisation device 20. For playback of the latter, the computer device 22 itself may have built-in acoustic means 30, such as in the form of a loudspeaker 32 or a headphone jack (not shown). Alternatively, a wireless connection to external acoustic means 30, such as Bluetooth speakers or headphones, may be produced via the electronics 26.

The partial model formed by the relief 8 is preferably formed of a typical road construction material, such as a concrete or asphalt material, and extends, according to FIGS. 2 to 5, at least from a mirror plane E passing through a main longitudinal axis HA of the automobile to be represented, on an outer side 34 over a lateral extension Ls transverse to the base surface 10. Over this lateral extension Ls, the partial model 6 in the embodiment shown has a smaller scale than in the direction of the main longitudinal axis HA. The lateral extension Ls is compressed by a maximum of 80% compared to an extension resulting from the other scale of the model. In the embodiment of FIGS. 2 to 5, the lateral extension Ls shown is about 60% of the extension that would result according to the scale used in the direction of the main longitudinal axis HA. As a result, the side extension Ls and the associated front and rear views according to FIGS. 3 and 4 are more compressed than the views in the direction of the main longitudinal axis HA. In this way, it is possible to represent the automobile over more than half of its lateral extension Ls and still maintain a relatively flat and compact shape of the projection object 4.

In addition, several markers 36 are provided on the projection object 4, which are formed by certain characteristic contours or contour sections of the relief 8 and whose position data are stored in the electronics 26. The markers 36 stored and thus detectable by the electronics 26 are distributed 3-dimensionally over the relief 8 and/or the remaining projection object 4, so that the visualisation device 20 can determine the position and the viewing angle of the camera 24 relative to the projection object 4 in real time by capturing and assigning the markers 36 and the stored position data and use them for image processing.

This thereby enables the creation of a VR model 40, such as in the form of a full model 42, which is rendered in the region of the partial model 6 formed by the relief 8 and virtually extends into or through the base surface 10, as shown by dashed lines in FIGS. 2 to 5. This full model 42 is displayed to the user B on the display apparatus 28, wherein the relief 8 forms a projection surface on which the full model 42 is "anchored" via the markers 36 regardless of the respective viewing direction.

In this way, the projection object 4 can be augmented in relation to the user B via relief and presented or "brought to life" with versatile content. As shown in FIG. 6, in a first step the user points the camera 24 at the physical projection object 4 in order to capture it optically. In a second step, image data of the projection object 4 are created with the help of the data-processing software S of the electronics 26 and superimposed with the stored model data M in a third step. In this way, the VR model 40 is obtained, which is rendered on the relief by means of the markers 36 and, in a fourth step, is displayed on the display apparatus 28 against the background of the remaining projection object 4.

As can be seen in particular from FIG. 7, depending on the viewing direction of the camera 26, the user can have the VR model 40 displayed as a full model 42 which extends into the base surface 10 which is also displayed. By positioning the visualisation device 20 accordingly, the user B can have a top view on the roof side as shown in FIG. 2, a front view as shown in FIG. 3, a rear view as shown in FIG. 4, a bottom view as shown in FIG. 5, a side view as shown in FIG. 6 and all intermediate views of the full model 42 displayed.

As can also be seen in FIG. 7, additional information content I from the stored additional information data Z can be displayed in addition to the VR model 40. For this purpose, the projection object 4 forms a substantially flat physical projection surface 44 within the base surface 10 between the relief 8 and an edge of the base surface or the frame 12. The display of this on the display apparatus 28 can then be used to display the additional information content I. The additional information content I may be provided, for example, by vehicle data, information relating to the technology and/or history of the vehicle, or for the reproduction of detail or exploded views of structural parts.

Furthermore, in connection with the display of the VR model 40, animations can also be reproduced or background images and/or films can be displayed. In addition, voice outputs, noises or pieces of music can also be generated by means of the audio files, the output of which is effected via the acoustic means 30.

The respective desired variants of the VR model and the information content to be output can be individually selected by the user B preferably via a selection menu 46 also displayed within the projection surface 44.

Furthermore, the selectable model data M, additional information data Z and/or audio files A can be selected, for example, via an internet platform IP and downloaded to the electronics 26 of the visualisation device 20, which is connected to the internet platform IP for this purpose, as shown in FIG. 1. In this way, the user can individually set up or expand the visualisation device 20 and the visualisation assembly 2 as a whole.

It should be noted that all of the elements and features of the different embodiments of the object of the invention described above can be interchanged or combined with one another, provided that an interchange or combination of the same is not precluded for technical reasons.

The invention claimed is:

1. A visualisation assembly with a 3-dimensional physical projection object and with an electronic visualisation device, comprising:
   a camera for optical capturing of the physical projection object;
   electronics with data-processing software, by means of which image data from the optical capturing of the physical projection object and a rendered Virtual Reality (VR) model can be generated on the basis of the created image data and stored model data; and
   a display apparatus on which the physical projection object with the rendered VR model superimposed on it can be displayed,
   wherein the physical projection object forms a relief and has a base surface from which the relief extends, wherein the projection object can be handled in the manner of a picture, wherein the relief forms a partial model which is superimposable with the virtually completed VR model which extends into the base surface.

2. The visualisation assembly according to claim 1, wherein the relief of the projection object forms a partial model of a means of transport.

3. The visualisation assembly according to claim 2, wherein the VR model can be generated as a virtual full model which is partially rendered in the region of the partial model.

4. The visualisation assembly according to claim 3, wherein the partial model of the projection object extends with respect to the VR model at least from a mirror plane extending through a main longitudinal axis of the full model to an outer side.

5. The visualisation assembly according to claim 2, wherein the partial model of the projection object has a smaller scale perpendicular to the base surface than in a direction parallel to the base surface.

6. The visualisation assembly according to claim 1, wherein a plurality of markers are provided on the projection object for creating the VR model in real time and adapted to a viewing angle of the camera.

7. The visualisation assembly according to claim 6, wherein the markers are at least partially formed by contours of the relief and have a three-dimensional distribution.

8. The visualisation assembly according to claim 1, wherein the projection object extends away from wall mounting means.

9. The visualisation assembly according to claim 8, wherein the wall mounting means comprise a frame.

10. The visualisation assembly according to claim 1, wherein a physical projection surface is stretched between the relief and an edge of the base surface.

11. The visualisation assembly according to claim 1, wherein, in addition to the model data, additional information data is stored on the electronics, by means of which additional information can be generated on the projection surface.

12. The visualisation assembly according to claim 1, wherein, in addition to the model data, audio files are stored on the electronics, by means of which an acoustic output can be generated via acoustic means.

13. The visualisation assembly according to claim 1, wherein the model data, the additional information data and/or the audio files can be downloaded to the electronics.

14. The visualisation assembly according to claim 1, wherein at least the camera and the display apparatus are formed by a portable computer apparatus.

15. The visualisation assembly according to claim 1, wherein the projection object is at least partially produced from a concrete material.

16. A method for operating the visualisation assembly according to claim 1, the method comprising:
   in a first step, the camera is directed towards the physical projection object, which forms a relief, for optical capturing;
   in a second step, image data of the physical projection object is created based on the optical capturing by means of the data-processing software;
   in a third step, the created image data is superimposed with the stored model data in order to create the rendered VR model; and
   in a fourth step the physical projection object with the superimposed rendered VR model is reproduced on the display apparatus,
   wherein prior to the first step the projection object is fixed to a wall and in the fourth step a partial model formed on the relief is extended in the direction of the wall by the superimposed VR model.

17. The method according to claim 16, wherein in the fourth step the additional information is generated by means of the additional information data stored on the electronics and displayed on the display apparatus next to the VR model.

18. The method according to claim 16, wherein in the fourth step audio files are additionally selected and their contents are output via acoustic means.

19. The method according to claim 16, wherein the model data, additional information data and/or the audio files are displayed in a selection menu before being displayed.

20. The method according to claim 16, wherein the model data, the additional information data and/or the audio files can be selected via an internet platform and downloaded to the electronics of the visualisation device.

* * * * *